(12) United States Patent
Winkler et al.

(10) Patent No.: US 10,060,389 B2
(45) Date of Patent: Aug. 28, 2018

(54) METHOD AND APPARATUS FOR VARIABLE EXHAUST NOZZLE EXIT AREA

(71) Applicant: The Boeing Company, Chicago, IL (US)

(72) Inventors: Chad M. Winkler, Glen Carbon, IL (US); Andrew J. Dorgan, Edwardsville, IL (US); Eric L. Werner, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 236 days.

(21) Appl. No.: 14/817,045

(22) Filed: Aug. 3, 2015

(65) Prior Publication Data

US 2015/0354498 A1    Dec. 10, 2015

Related U.S. Application Data

(63) Continuation-in-part of application No. 12/968,106, filed on Dec. 14, 2010, now abandoned.

(51) Int. Cl.
| | |
|---|---|
| *F02K 1/30* | (2006.01) |
| *F02K 1/28* | (2006.01) |
| *F02K 9/97* | (2006.01) |
| *F02K 9/82* | (2006.01) |

(52) U.S. Cl.
CPC ............... *F02K 1/30* (2013.01); *F02K 1/28* (2013.01); *F02K 9/82* (2013.01); *F02K 9/97* (2013.01); *F05D 2250/13* (2013.01); *F05D 2260/16* (2013.01)

(58) Field of Classification Search
CPC ..... F02K 1/30; F02K 9/82; F02K 9/97; F02K 9/972; F02K 1/28

USPC .......................................................... 60/231
See application file for complete search history.

(56) References Cited

U.S. PATENT DOCUMENTS

| | | | |
|---|---|---|---|
| 4,686,824 A | 8/1987 | Dunaway et al. | |
| 6,679,048 B1 * | 1/2004 | Lee | F02K 1/002 |
| | | | 239/265.23 |
| 2005/0060984 A1 * | 3/2005 | Prouteau | F02K 1/1223 |
| | | | 60/267 |

(Continued)

FOREIGN PATENT DOCUMENTS

EP    1158156 A2    11/2001

OTHER PUBLICATIONS

R. E. Walker, AIAA Journal vol. 1, No. 2, Secondary Gas Injection in a Conical Rocket Nozzle 1962, pp. 334-338.*

(Continued)

*Primary Examiner* — Gerald L Sung
*Assistant Examiner* — Rene Ford
(74) *Attorney, Agent, or Firm* — Felix L. Fischer

(57) ABSTRACT

A nozzle effective exit area control system is created with a convergent-divergent nozzle with a divergent portion of the nozzle having a wall at a predetermined angle of at least 12° from the freestream direction. Disturbance generators are located substantially symmetrically oppositely on the wall to induce flow separation from the wall with the predetermined wall angle inducing flow separation to extend upstream from each disturbance generator substantially to a throat of the nozzle pressurizing the wall and reducing the effective area of the jet flow at the nozzle exit.

22 Claims, 18 Drawing Sheets

(56) References Cited

U.S. PATENT DOCUMENTS

2010/0089031 A1    4/2010  Wells et al.

OTHER PUBLICATIONS

Norman T. Musial, NASA Technical Memorandum X-83 1962, Overexpanded Performance of Conical Nozzles with Area Ratios of 6 and 9 with and without Supersonic External Flow.*
George P. Sutton, Rocket Propulsion Elements 2001, John Wiley & Sons, pp. 75, 609-619.*
Henry Tao-Sze Hsia, J. Spacecraft vol. 2, No. 1 1965, Shocks Induced by Secondary Fluid Injection, pp. 67-72.*
N. Maarouf, Thrust vectoring through fluid injectionin an axisymmetrical supersonic nozzle: Theoretical and computaional study, Universit'e d'Evry Val d'Essonne.*
Vladeta Zmijanovic, AIAA 2012-3874 2012, Experimental and Numerical Study of Thrust-Vectoring Effects by Transverse Gas Injection into a Propulsive Axisymmetric C-D Nozzle.*
E. Leon Morrisette, NASA Technical Paper 1207 1978, Turbulent-Flw Separation Criteria for Overexpanded Supersonic Nozzles.*
Andrew W. Cary, AIAA 2009-3650, Towards accurate flow predictions using unstructured meshes, The Boeing Company 2009.*
R.E. Walker, A.R. Stone, M. Shandor, "Secondary Gas Injection in a Conical Rocket Nozzle", AIAA Journal, vol. 1, No. 2, p. 334-338, Feb. 1963.

* cited by examiner

METHOD AND APPARATUS FOR VARIABLE EXHAUST NOZZLE EXIT AREA

REFERENCE TO RELATED APPLICATIONS

This application is a continuation in part of application Ser. No. 12/968,106 filed on Dec. 14, 2010 entitled METHOD AND APPARATUS FOR VARIABLE EXHAUST NOZZLE EXIT AREA having a common assignee with the present application, the disclosure of which is incorporated herein by reference. This application is copending with U.S. patent application Ser. No. 14/158, 954 filed on Jan. 20, 2014 entitled METHOD AND APPARATUS FOR NOZZLE THRUST VECTORING, issued as U.S. Pat. No. 9,551,296, the disclosure of which is incorporated herein by reference as though fully set forth.

BACKGROUND INFORMATION

Field

Embodiments of the disclosure relate generally to the field of area control of jet engine nozzle exhaust and more particularly to embodiments for inducing flow separation in the divergent section of an exhaust nozzle to symmetrically alter the effective divergence angle of the nozzle walls to alter effective exit area.

Background

Exhaust nozzle exit area (A9) control for jet engines enhances engine and aircraft performance. With additional requirements for increased maneuverability and performance of modern jet aircraft as well as survivability requirements, fixed geometry nozzle systems which provide for exit area control including vectored thrust systems have become important in achieving overall performance goals. Exit area control allows tailoring of engine performance for thrust optimization. Mechanical systems often use deflecting surfaces to physically alter nozzle shape and area. Mechanical control of the throat area has been attempted before (see U.S. Pat. No. 2,846,843 to Clark et al, entitled "Variable area convergent-divergent exhaust nozzle and control therefor") which does control the expansion ratio, but with a resulting change in the nozzle flow rate.

Fluidic systems have been employed but typically affect nozzle throat area or result in the generation of shocks in the divergent section which may be undesirable. Fluidic throat area control has been performed by as disclosed in U.S. Pat. No. 5,996,936 to Mueller entitled "Fluidic throat exhaust nozzle", and suffers the same problem of nozzle flow rate variation with a change in expansion ratio.

It has been attempted to control A9 with layers of combustible material which burn off during flight to give variable A9. See U.S. patent application Ser. No. 09/942,238 to Hawkins and Murdock entitled "Combustible outgassing material lined altitude compensating rocket nozzle". However, it is not always desirable to have combustion occurring on the walls of a nozzle. Nor do combustibles allow cyclic changes of area control during a flight mission as the combustibles can only be used once.

A combined system as disclosed in U.S. Pat. No. 3,010, 280 to Hausmann et al entitled "Variable-expansion nozzle" employs blowing combustible mixtures into the divergent section to occupy flow area, thus reducing the overall nozzle exit area. Again, it is not always permissible to use combustibles near the walls of a nozzle due to material limitations.

Mechanical systems are heavy due to the requirements for large control surfaces and actuators. Large amounts of injected flow in fluidic systems are not preferable due to the performance impact on the engine to supply the large amounts of secondary flow for injection (flow that could otherwise be used to produce thrust).

It is therefore desirable to avoid the weight penalties of mechanical nozzle exit area adjustment systems by providing effective exit area control. It is also desirable to provide effective exit area control which does not impact the nozzle throat area, thus easily maintaining the engine mass flow. Additionally, it is desirable to provide effective exit area control which is simple to implement and minimizes thrust losses.

SUMMARY

The disclosed embodiments provide a nozzle with a divergent portion having a divergent wall at a predetermined angle of at least 12° from the streamwise nozzle axis direction. Disturbance generators are located substantially symmetrically opposite on the divergent wall to induce flow separation where the predetermined wall angle is sufficient for the induced flow separation to extend upstream from disturbance generator substantially to the throat of the nozzle. This pressurizes the divergent walls and reduces the effective area of the exhaust flow at the nozzle exit. In certain example embodiments the convergent-divergent nozzle has a total angle no greater than 150 degrees.

For one embodiment the disturbance generator is an injection flow slot which may be located at least 50% of a divergence length from the throat of the nozzle to a trailing edge of the nozzle for certain engine and aerodynamic conditions or between 25% and 75% of a divergence length for alternative conditions. If the nozzle has sufficient structural depth, the injection may be performed at or near 100% of the divergence length. Injection flow through the injection slot is controlled between 0% and 4% of total flow for effective area control of the jet flow in the nozzle.

In certain example embodiments the convergent-divergent nozzle is a rectangular or two-dimensional (2D) nozzle having a first injection flow slot on a lower wall of the nozzle and a symmetrical injection flow slot on an upper wall of the nozzle.

In yet other embodiments the convergent-divergent nozzle is a three-dimensional (3D) nozzle having multiple injection flow slots arranged circumferentially around the divergent portion of the nozzle.

In operation the embodiments create a method for exit area reduction by providing a convergent-divergent nozzle with a total angle of less than 150° and a divergence angle of at least 10° (considering some nozzle operating conditions permit the separation effect with as little as 10° of divergence), but preferably 12° or greater with symmetrical disturbance generators located at predetermined locations on opposing surfaces of a divergent portion of the nozzle. Magnitude of the disturbance created by the disturbance generators is controlled to create non-shock induced flow separation from a wall of the divergent portion. The predetermined location of the disturbance generator is defined to create a flow separation zone extending substantially from the nozzle throat to the nozzle trailing edge and the magnitude of the disturbance is controlled to create the flow separation zone with a magnitude to induce a desired reduction in effective exit area (AE9).

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein demonstrate effective exit area control employing a nozzle which has a convergent and divergent cross section. The divergent portion incorporates walls at an angle which is steeper than normally used in conventional nozzle designs. The steeper wall is then exploited to efficiently generate flow separation when a disturbance is introduced on the wall. Inducing flow separation in the divergent section of the nozzle fluidically changes the divergence angle of the flow from the wall in a two-dimensional (2D) nozzle or comparable structure in a three-dimensional (3D) nozzle. This results in a reduction in area of the exhaust flow as the effective shape of the divergent jet in the nozzle is separated from the wall. The disturbance which causes separation can be a fluidic jet, pulsed jet, or synthetic jet such as a vibrating membrane or sonic impulse with no net mass flux or other method to produce a disturbance to cause separation of the jet flow from the wall. The wall angle is such that the separation travels upstream from the disturbance (jet) to just aft of the throat. This pressurizes the entire wall, giving a net flow separation from the wall with a commensurate reduction in effective area of the exhaust flow at the exit of the nozzle. No shock is generated in the divergent section, the sonic line remains undisturbed and the throat area remains constant.

Figure 1A:
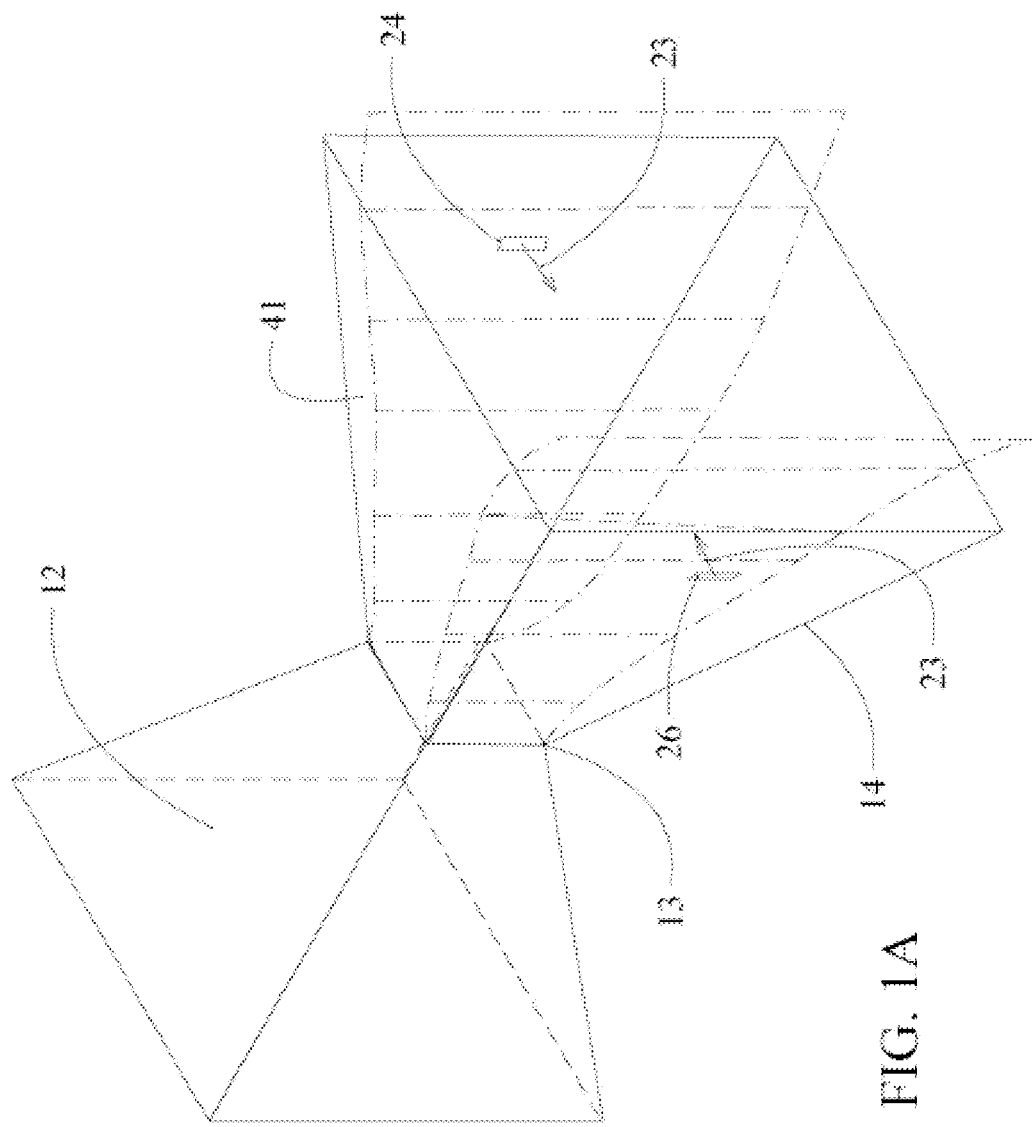
FIG. 1A is a pictorial representation of an example embodiment showing induced flow separation.
Figure 1B:
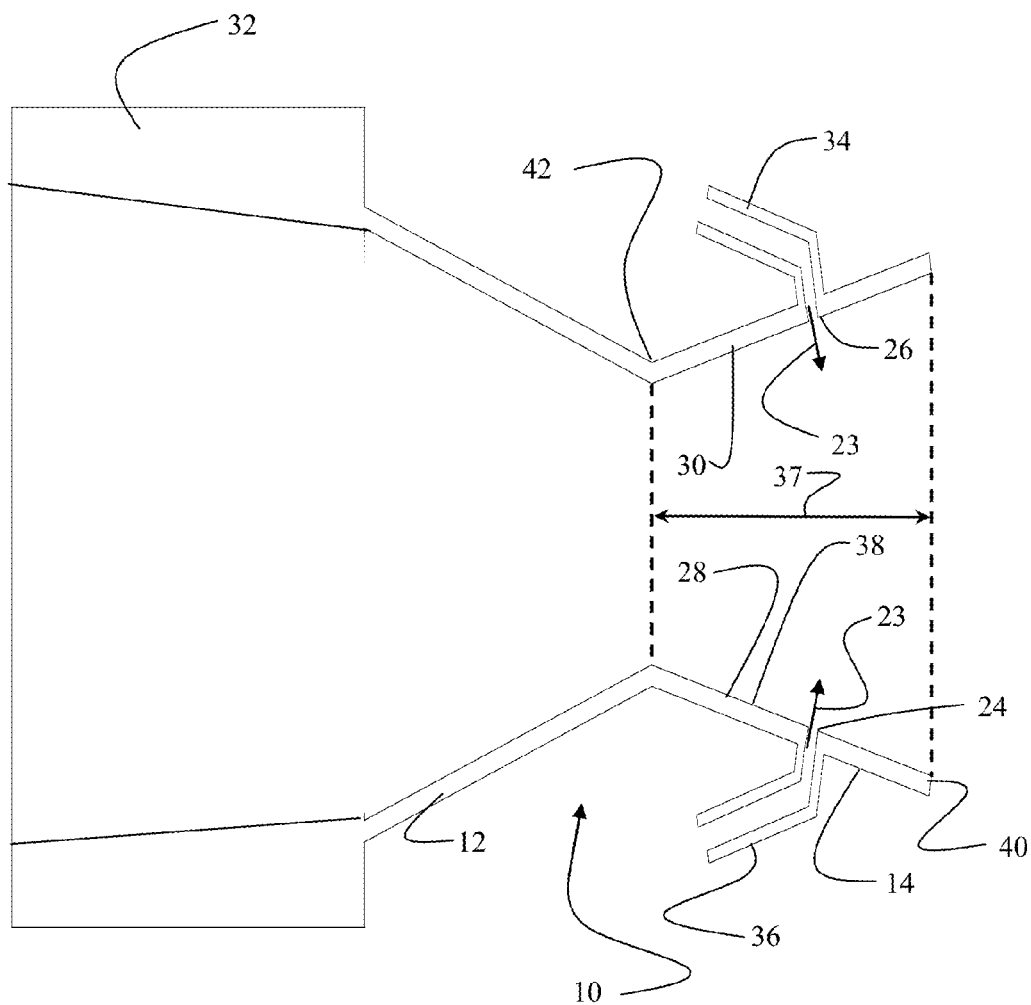
FIG. 1B is side cross section view of the example embodiment with a 2D Nozzle.
Figure 2:
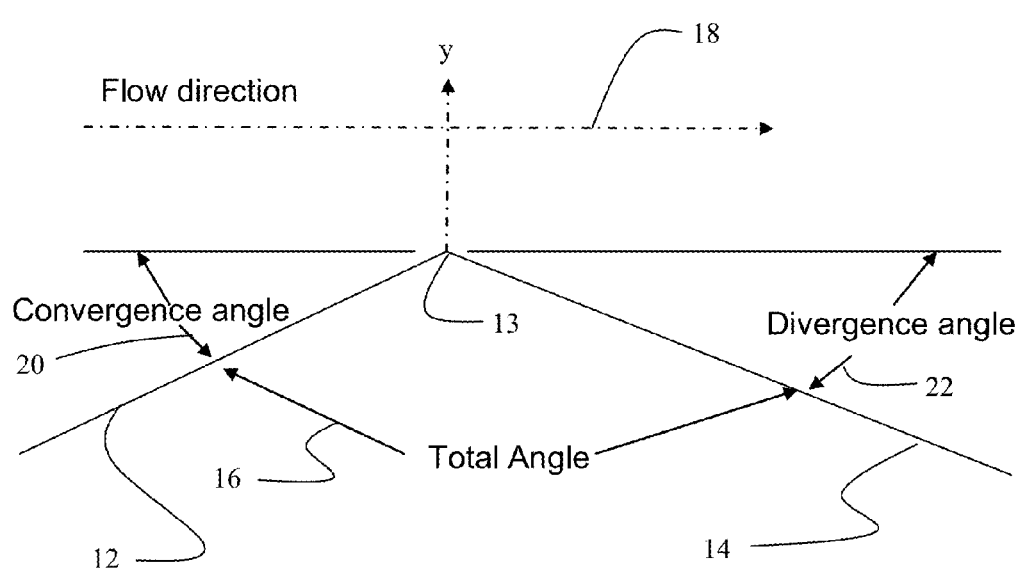
FIG. 2 is a side view diagram of angular relationships of convergent and divergent portions of the nozzle of FIG. 1B.

Referring to the drawings, FIGS. 1A and 1B show an embodiment having a nozzle 10 with a convergent inlet portion 12 and a divergent outlet portion 14. As represented in FIG. 2, the total angle 16 between the convergent inlet portion and divergent outlet portion is less than or equal to 150°. With respect to a streamwise nozzle axis 18, the convergence angle 20 of the inlet portion is greater than 18° and the divergence angle 22 of the outlet portion is greater than 12°. The exact angles are chosen by taking into account the maximum area change desired as well as the desired expansion ratio and mass flow rates of the nozzle and the combination of angles is chosen to provide shock free separation of flow as will be described in greater detail subsequently. Greater divergent angles will generally lead to greater divergence of the jet from the nozzle walls and greater reduction in AE9. In most embodiments, the convergent angle will be steeper (i.e. having a greater angle magnitude) than the divergent angle. Divergent angles substantially less than 12 degrees will typically result in shock waves when injection is performed and are not appropriate for the current embodiments. The exact angle of shock onset is dependant upon many factors such as expansion ratio and pressure, and the values employed in the embodiments disclosed herein are typical. The convergent inlet portion 12 and divergent outlet portion 14 intersect at a sharp nozzle throat 13. The "sharpness" of the nozzle throat 13 may be quantified in terms of the second derivative (termed y") of a curve defining the surface geometry of the intersecting convergent inlet portion 12 and divergent outlet portion 14 at the nozzle with respect to the streamwise direction. For some embodiments, an absolute magnitude of the second derivative, |y"|, may be greater than from about 4 inch$^{-1}$ to about 8 inch$^{-1}$. For example, in some embodiments, if the throat is at x=0 inches, then a typical throat curve may have the form y=$(0.125^2-x^2)^{0.5}$ inches. The second derivative at the throat would then be y"=−1/0.125 inch$^{-1}$, or |y"|=8 inch$^{-1}$. Additionally, the divergent outlet portion 14 may have substantially flat walls with respect to the flow direction. For example, the absolute value of the second derivative, |y"|, may be about 0.005 inch$^{-1}$ to about 0.002 inch$^{-1}$. In some examples, for the divergent section to encompass a "substantially flat" divergent wall, the curve may be defined by the equation y=$(200-x^2)^{0.5}$ inches. For such examples, the second derivative, with x=0 centered in the divergent section midpoint, would be y"=−0.005 inch$^{-1}$, or |y"|=0.005 inch$^{-1}$.

In the example in FIGS. 1A and 1B, flow disturbance in the divergent outlet portion 14 is created in the embodiment shown using by a plurality of disturbance generators (shown in the drawings as fluidic jets represented by arrows 23) introduced through flow slots 24 and 26 on the diverging walls of the nozzle, the lower diverging wall 28 and upper diverging wall 30 respectively in the view of FIG. 1B. Slot 26 is substantially symmetrically opposite slot 24 with respect to the streamwise nozzle axis for symmetrical divergence of flow from the walls. The designation of an upper and/or lower wall is used for purposes of illustration and is not limiting; the disturbance generator(s) may be located along any divergent wall (including top, bottom, or side walls) of the nozzle as may be suitable for the particular application. As previously described disturbance generators according to the present disclosure (e.g., disturbance generators 24 and 26 in FIG. 1B) may be implemented using any technology suitable to cause a disturbance in the flow along a divergent wall. In some embodiments, the disturbance generator may include one or more fluidic jets, pulsed jets, synthetic jets (e.g., a vibrating membrane, sonic impulse generator, or the like), or combinations thereof. In some examples, the disturbance generator may be a zero-net mass flux jet (e.g., a synthetic jet). In such examples no secondary fluid may be needed and the existing fluid (e.g., the exhaust gas) may be manipulated to cause the disturbance and thereby induce flow separation. In some embodiments herein (e.g., as shown in FIGS. 1A and 1B, 5, 6A-6D, and 7A-7C), the disturbance generators may include "slots" through which fluidic jets, pulsed jets, or synthetic jets may be introduced. For the exemplary embodiment using fluidic jets introduced through slots 24, 26, injection flow is provided by engine bleed or other diverted flow from an engine 32 through ducts 34 and 36. Dimensions of the slots and ducts are not to scale and have been exaggerated for clarity. For an exemplary trapezoidal or 2D nozzle, slots having a spanwise length of 3 inches to 12 inches and a streamwise width of 0.1 inch to 2 inches may be used for nozzle exit dimensions between 70 inches×10 inches to 280 inches×40 inches. The injection location (e.g., location of disturbance generator which may be expressed as a % of divergence length) The injection location is determined based upon the particular nozzle configuration and divergence length 37. In some embodiments, the injection location will be between the midpoint 38 and trailing edge 40 of the divergent outlet portion 14. Injection locations further upstream may be utilized in some applications and a nominal range of 25% to 75% of divergence length is anticipated for optimum operation. However, where structural depth to accommodate necessary plumbing is present in the nozzle, injection at 100% of the divergence length may be employed.

Figure 3A:
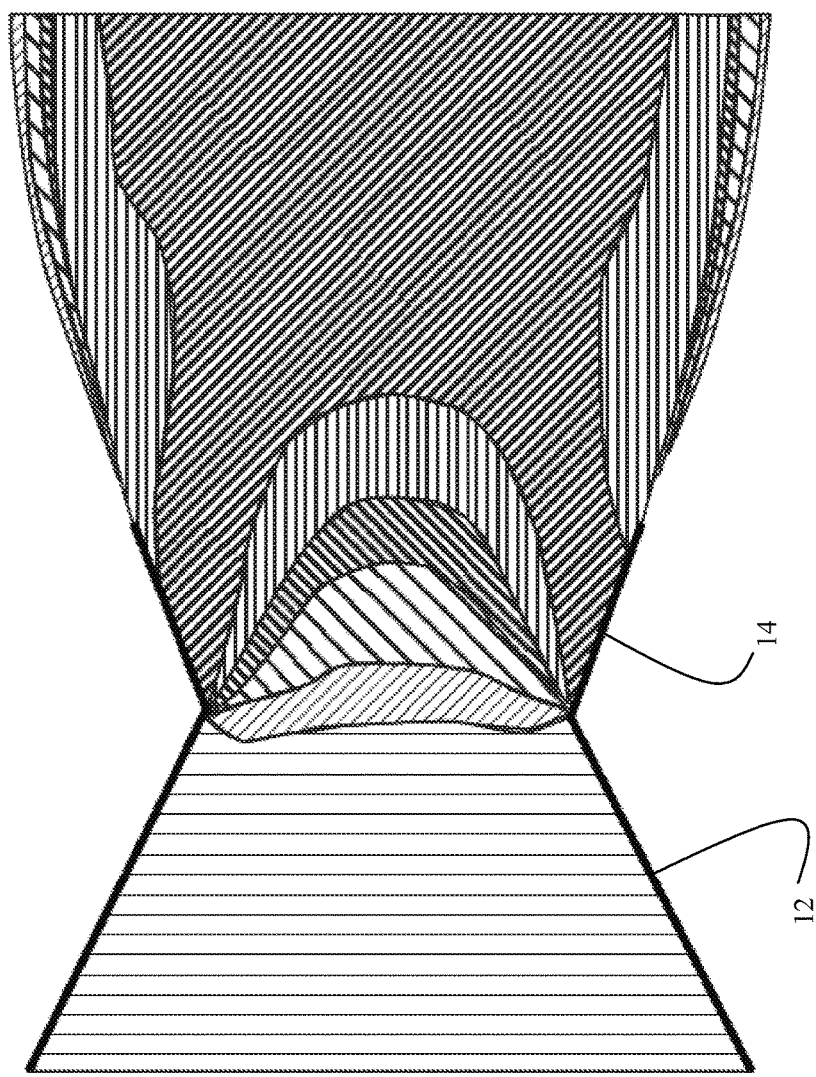
FIGS. 3A-3C are side views of representations of the flow field from a Computational Fluid Dynamics (CFD) solution for the 2D nozzle with no secondary flow, 2.6% secondary flow and 7.6% secondary flow.
Figure 3A:
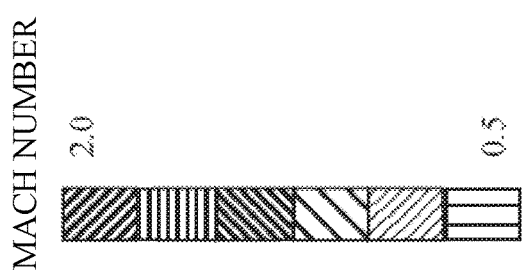
Figure 3B:
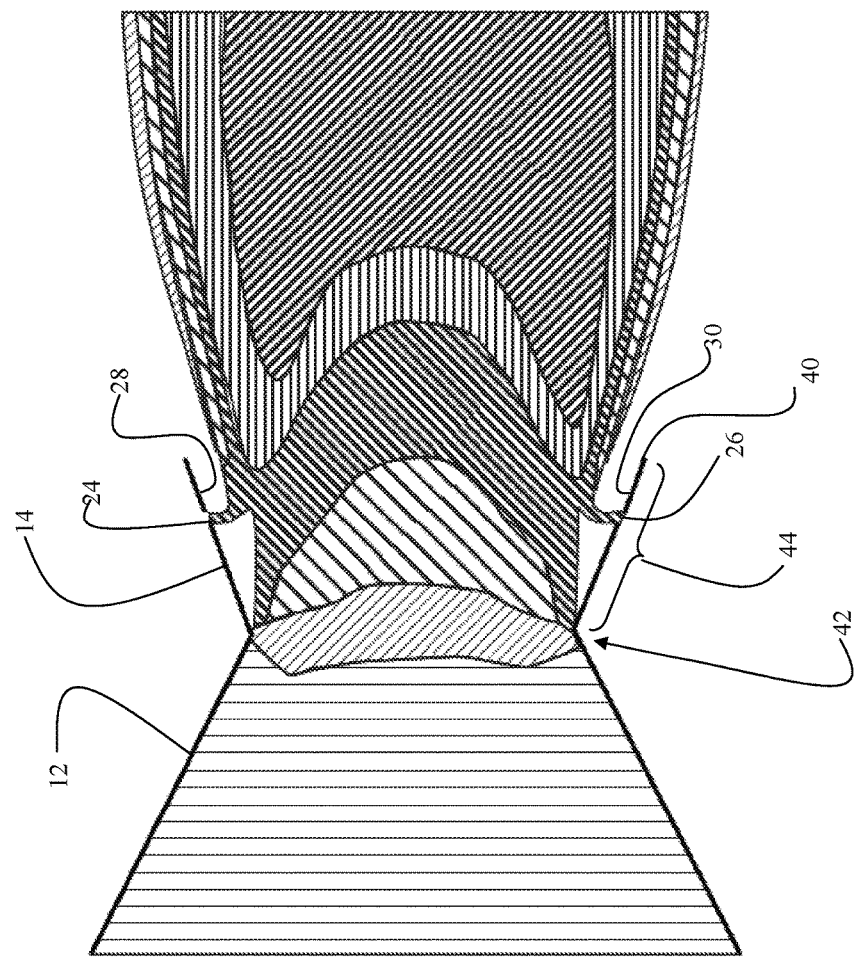
Figure 3B:
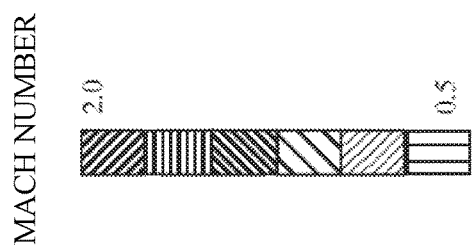
Figure 3C:
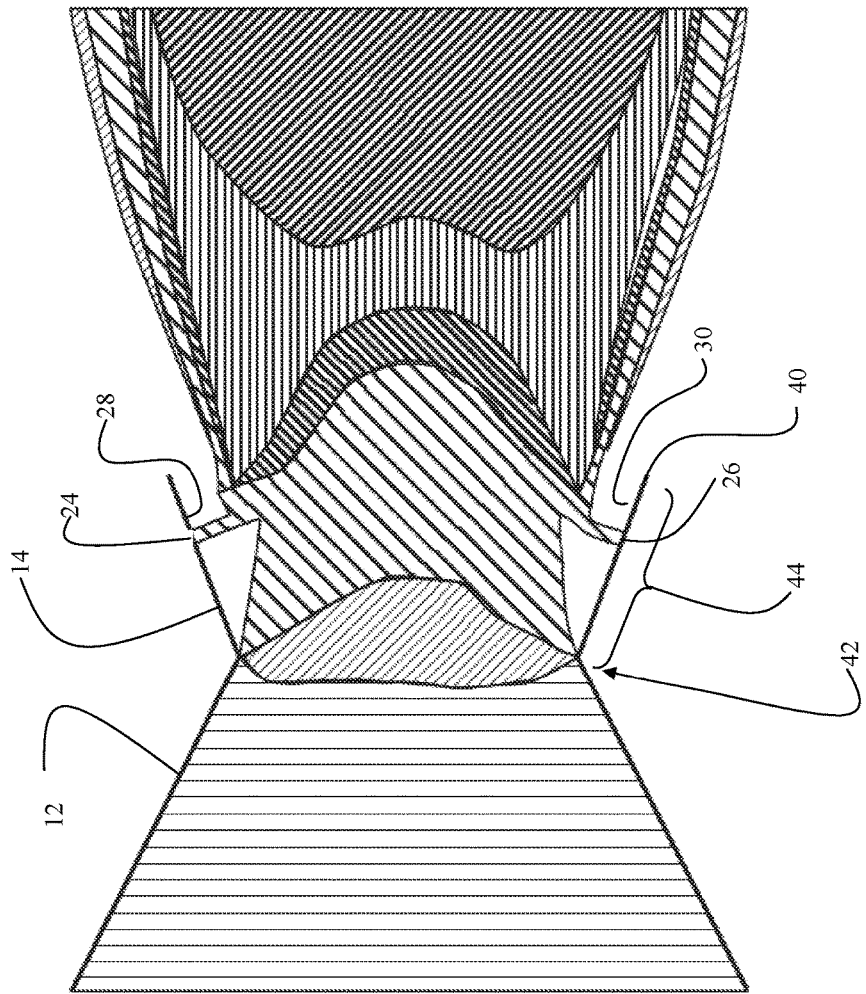
Figure 3C:
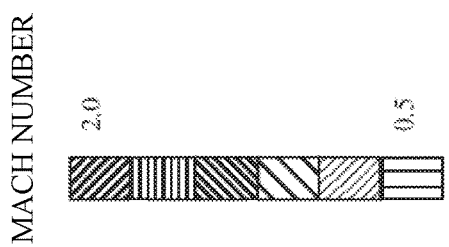

To facilitate understanding of the disclosed embodiment, FIGS. 3A-3C are a representation of the flow field from a Computational Fluid Dynamics (CFD) solution for the 2D nozzle of the embodiment having a nozzle pressure ratio (NPR) of 5 (which is near the design condition for this nozzle) with varying injection flow described in greater detail subsequently. The Mach profile of the flow is shown in graded contours represented by the hatching in the flow field from Mach 0.5 to Mach 2.0. The fluidic injection takes place on divergent walls 28 and 30 in the divergent section through slots 24 and 26. The flow separates just aft of but substantially at the throat 42 and the flow separation zone 44 created by flow separation pocket 41 persists to the exit aperture at the trailing edge 40 of the nozzle thus altering the effective exit area AE9. No shock is formed from including the divergent wall injector since the separation begins just aft of the throat where the Mach number is unity. This concept effectively alters the divergence angle of the nozzle. Increasing injection flow results in an increasing change in effective exit area progressing from FIG. 3A with a lower injection flow to FIG. 3C with highest injection flow.

Figure 4:
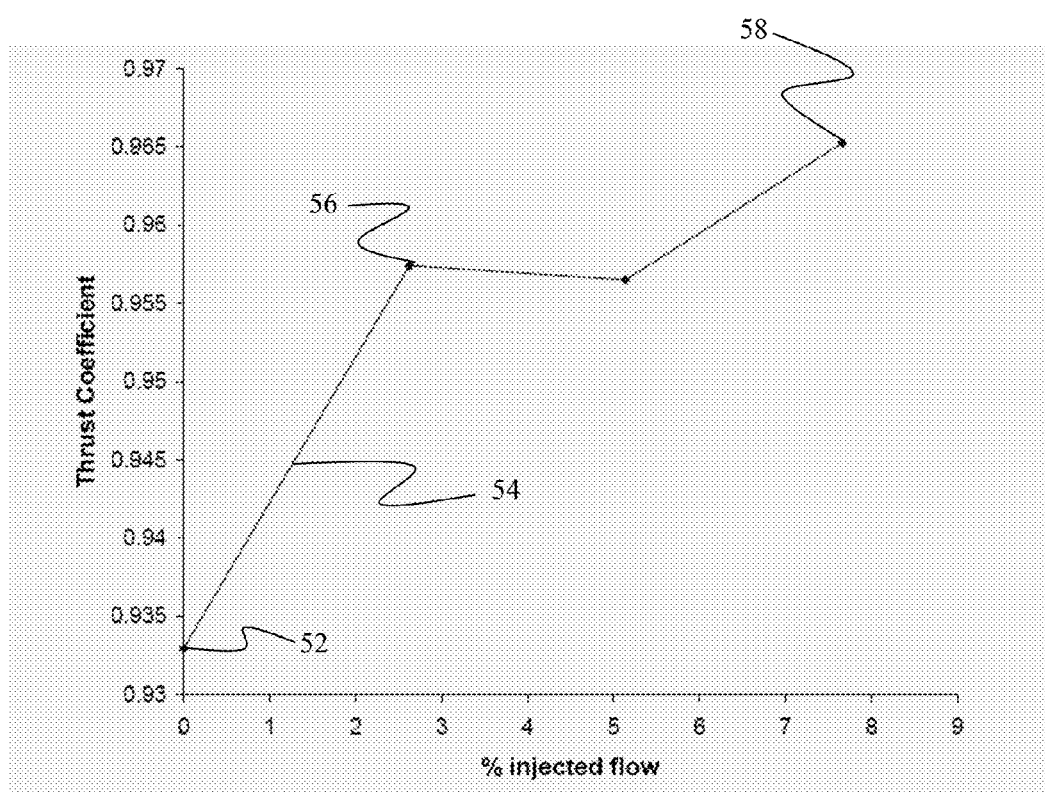
FIG. 4 is a graph of thrust coefficient created by injected flow in the 2D nozzle represented in FIGS. 3A-3C.

Referring to FIG. 4 in conjunction with FIGS. 3A-3C, with injected flow described as a percent of total flow through the nozzle (% injected flow), with no injected flow, the nozzle exit area A9 results in a thrust coefficient of 0.933 as represented by point 52 on trace 54 and shown in FIG. 3A. A 2.6% injected flow (total injection from summing both injectors) through slots 24 and 26 results in a reduction in exit area providing a thrust coefficient of 0.957 as represented by point 56 and shown in FIG. 3B. An injected flow of 7.6% results in area AE9 change for a thrust coefficient of 0.965 as represented by point 58 and shown in FIG. 3C. The optimum amount of injection will depend on nozzle configuration, and the trend in thrust coefficient with injection flow is nonlinear. Injected flow in the range of 0-10% is anticipated for AE9 control through a desired performance range.

In some embodiments, a synthetic jet may be used in place of or in addition to fluidic jets. The synthetic jet may be selected or configured to generate a disturbance comparable to a disturbance created by a fluidic jet, e.g., by comparing the root mean square (RMS) of the mass flow ratio of the synthetic jet to the steady blowing value of a fluidic jet. For example, to obtain an equivalent of 2% mass flow steady blowing, a RMS of 2% mass flow may be used in the case of a synthetic jet. The frequency of the pulse can be determined based on the length of the divergent section (L) and the velocity of the flow in the divergent section (U). A time scale (T) can be defined as T=L/U. In some embodiments, a desired separation effect may be achieved using a synthetic jet operable to generate pulses at a frequency of at least 20*(1/T) Hz.

Figure 5:
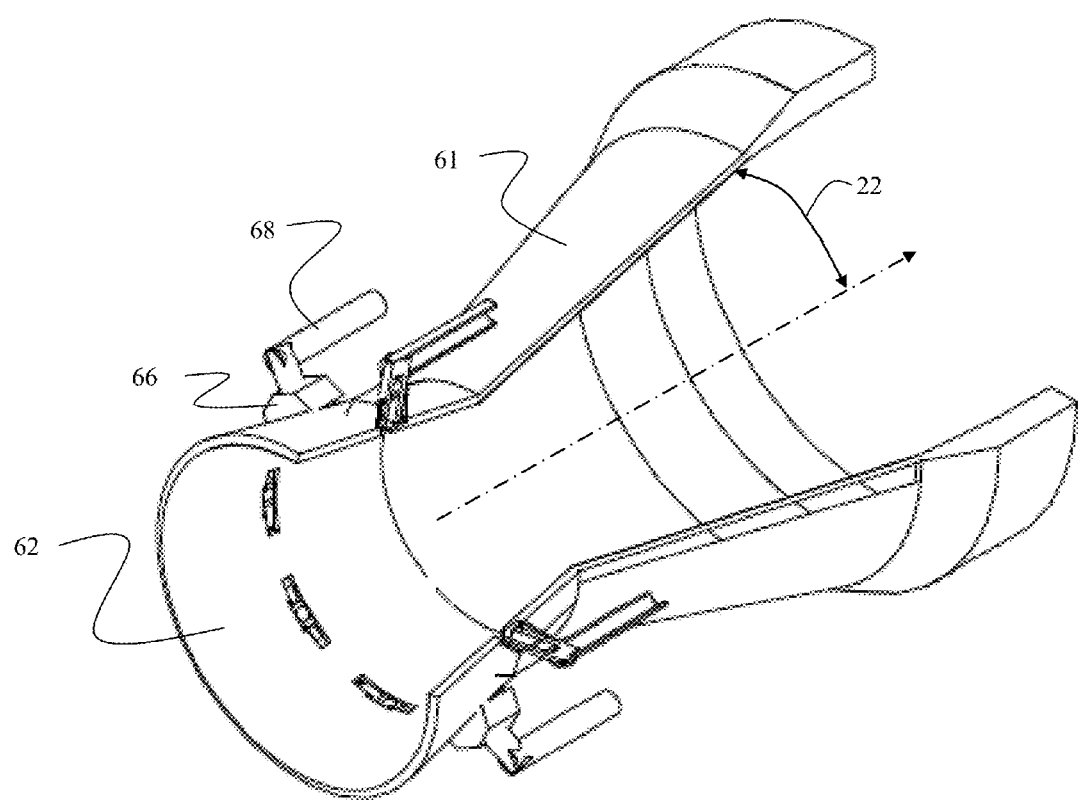
FIG. 5 is a partial section isometric view of an example 3D nozzle embodiment.

As described, the examples herein may be utilized with virtually any nozzle system including 2D nozzles, as well as square, rectangular or trapezoidal three dimensional (3D) nozzles. An exemplary cylindrical 3D nozzle employing the apparatus and method may be embodied as shown in FIG. 5. FIG. 5 shows an axisymmetric nozzle 64 including a convergent inlet portion 61 and divergent outlet portion 62 that have similar geometric relationships to the 2D embodiments described. The nozzle 64 may include many or all components similar to the components of the 2D embodiments described above and for brevity and clarity their description is not repeated. For example, the nozzle 64 may have a total angle of less than 150° created by convergence angle of the inlet portion is greater than 18° and divergence angle 22 of the outlet portion greater than 12°. The disturbance generators may be implemented as multiple injection inlets or slots 66 with associated feed conduits 68 that may be provided around a circumference of the diverging outlet portion of the nozzle 64. In the depicted example eight inlets at 45° spacing are shown. Other arrangements of the inlets or slots may be utilized, e.g. four inlets at 900 spacing or a greater number of inlets for refined control of wall separation by the jet may be employed. Multiple sets of injection inlets may be spaced along the length of the diverging outlet portion to accommodate multiple design operating conditions of the jet.

Figure 6A:
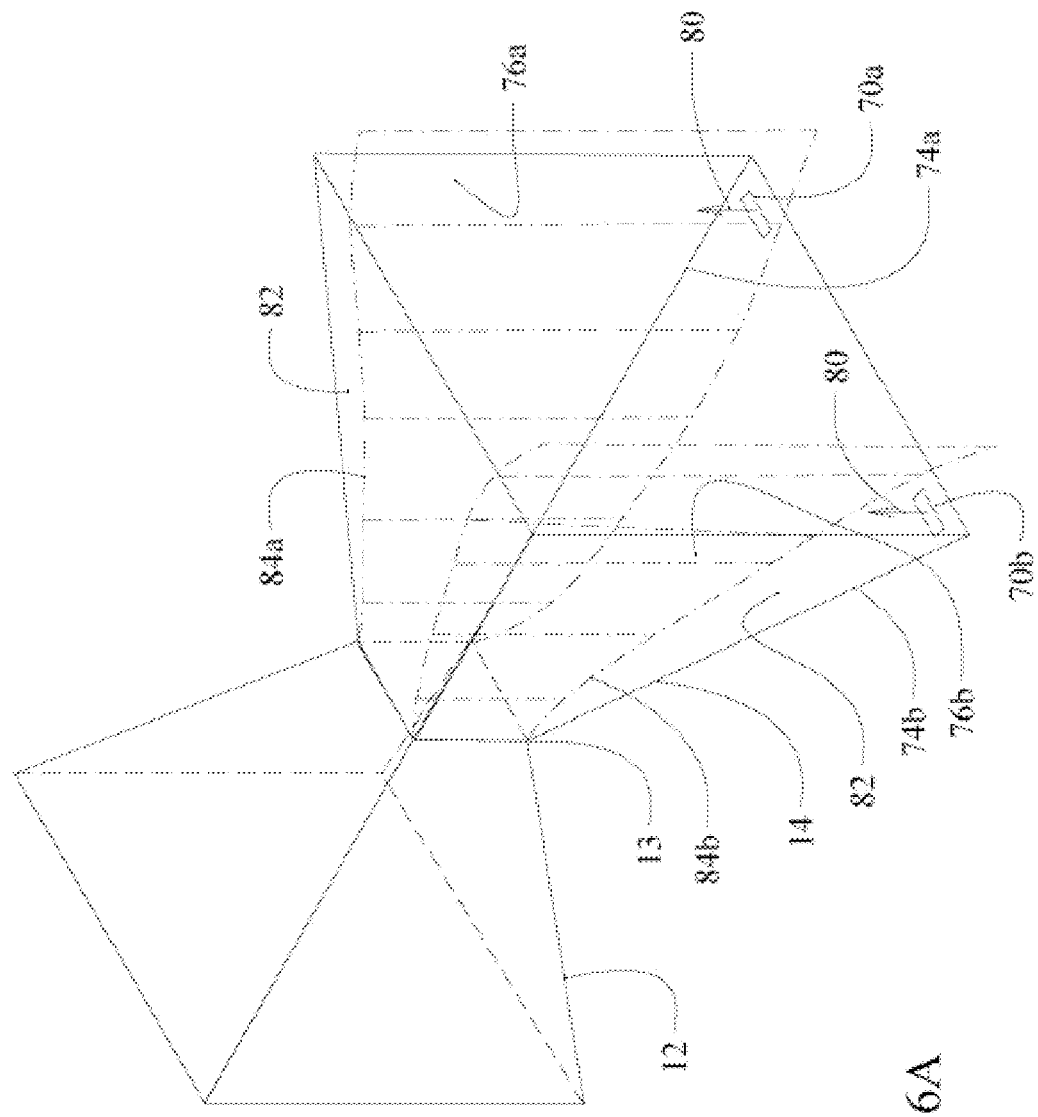
FIG. 6A is a pictorial representation of an adjacent injection embodiment.
Figure 6B:
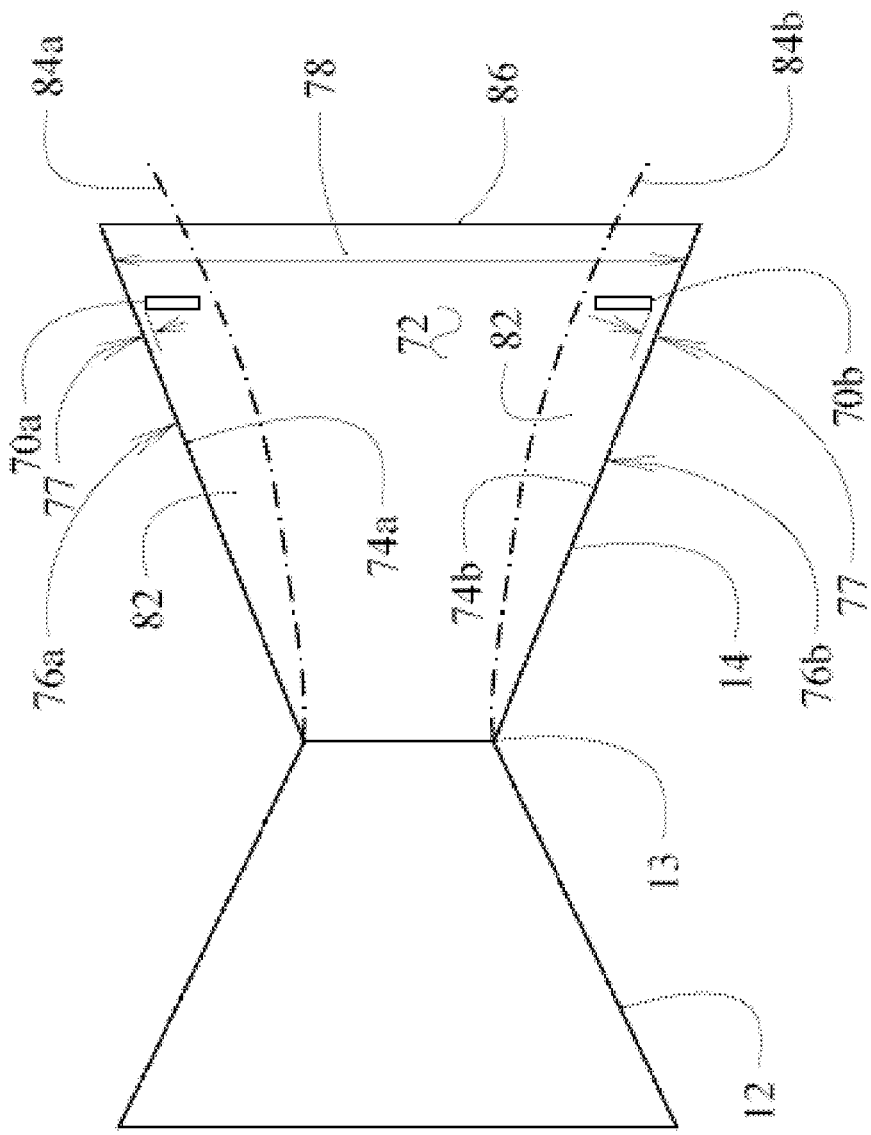
FIG. 6B is a top view of the embodiment of FIG. 6A.
Figure 6C:
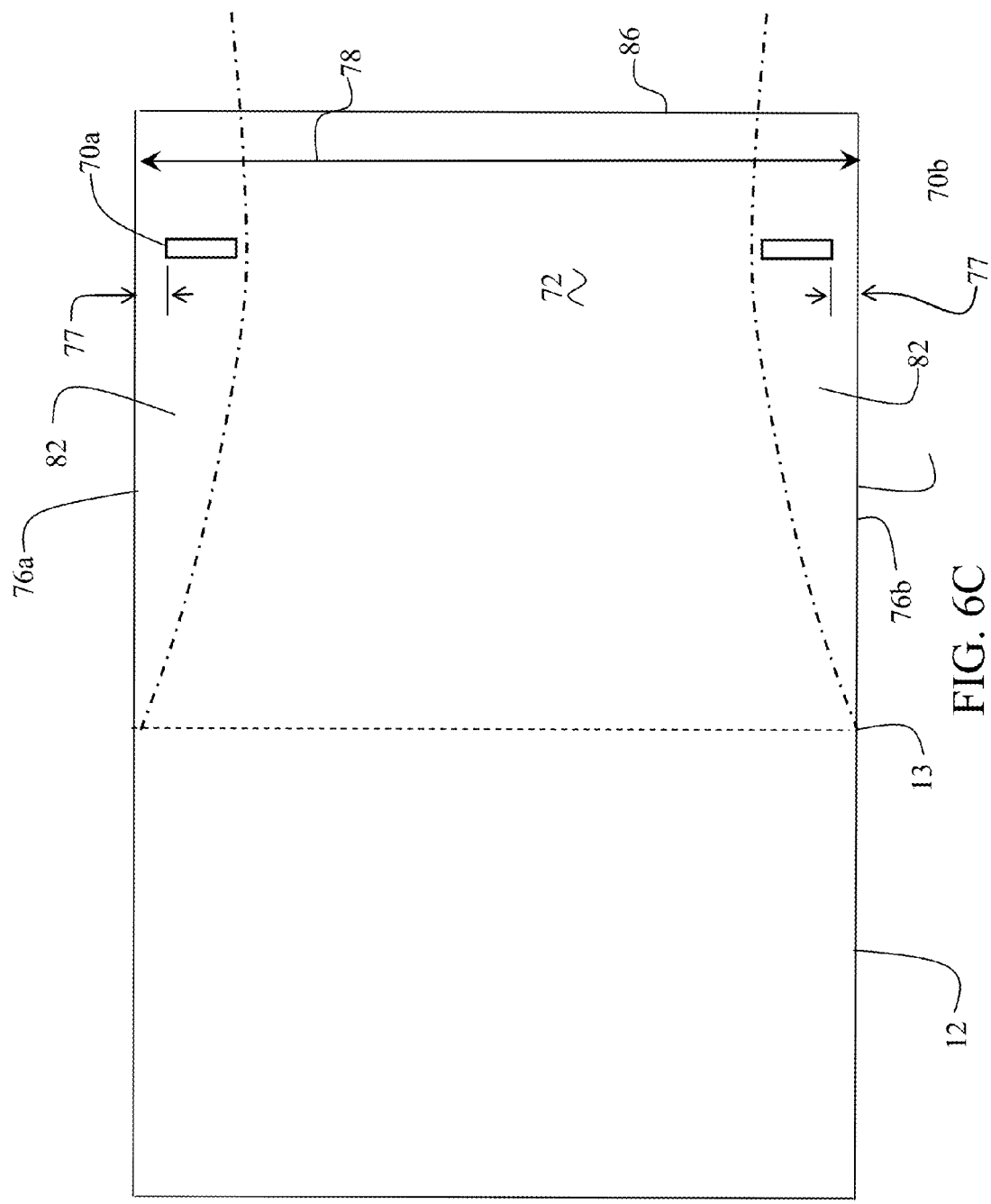
FIG. 6C is a top view of a 2D nozzle embodiment of FIG. 6A.

In some examples, the disturbance generators may be located on a wall adjacent to the divergent walls on which separation is desired. As shown in FIGS. 6A and 6B, disturbance generators 70a and 70b, which may be a fluidic jet injection slots as previously described, are provided in wall 72 of the divergent outlet portion 14. The disturbance generators may be proximate an intersection of two walls. For example, as shown in FIGS. 6A-6B, the disturbance generators 70a and 70b are immediately adjacent the intersections 74a and 74b of wall 72 and divergent walls 76a and 76b, respectively. In some embodiments, spacing 77 of disturbance generators 70a and 70b from the intersections 74a and 74b is no more than a factor of 2 times the width of the slot. In exemplary embodiments the distance of the injection slots from the divergent walls may be 10%-20% of a width 78 of the adjacent wall between the divergent walls. The effect of the disturbance, (e.g., flow injection from a fluidic jet represented by arrows 80 from the disturbance generators 70a and 70b or a synthetic jet) is substantially parallel to the divergent walls 76a and 76b and creates a flow separation zone or separation pockets 82 between the divergent wall and the jet plume boundaries 84a and 84b. The dimensions of the slots and separation pockets in FIGS. 6A and 6B are exaggerated for clarity and are not to scale as previously described with respect to FIGS. 1A and 1B. Location of the disturbance generators 70a and 70b may be from a midpoint of the divergence length to the trailing edge 86 of the nozzle with exemplary embodiments at 25 to 75% of the divergence length. While the nozzle of FIGS. 6A and 6B is depicted as a "square" nozzle with symmetrical divergence in both sets of opposing walls, the nozzle may be a 2D nozzle with non-diverging walls orthogonal to the diverging walls as shown in FIG. 6C.

Figure 7C:
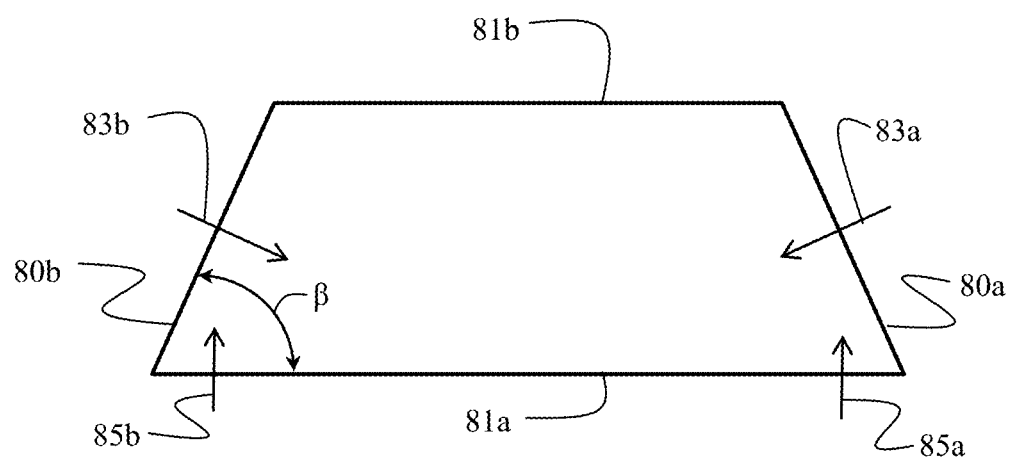
FIG. 7A is a pictorial representation of a combined adjacent and common wall injection for flow separation.
FIG. 7B is a top view of the embodiment of FIG. 7C.
Figure 7A:
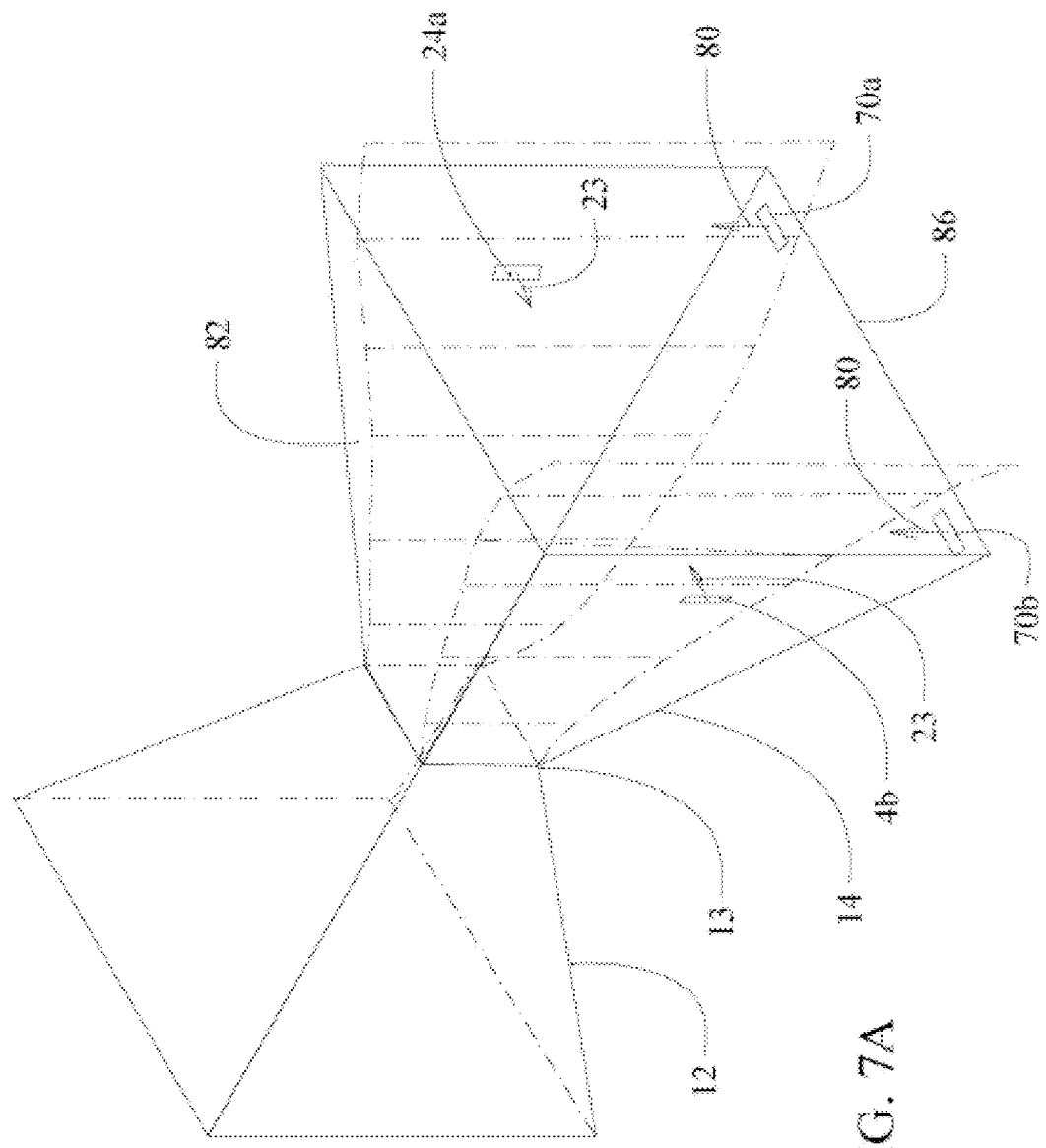
Figure 7B:
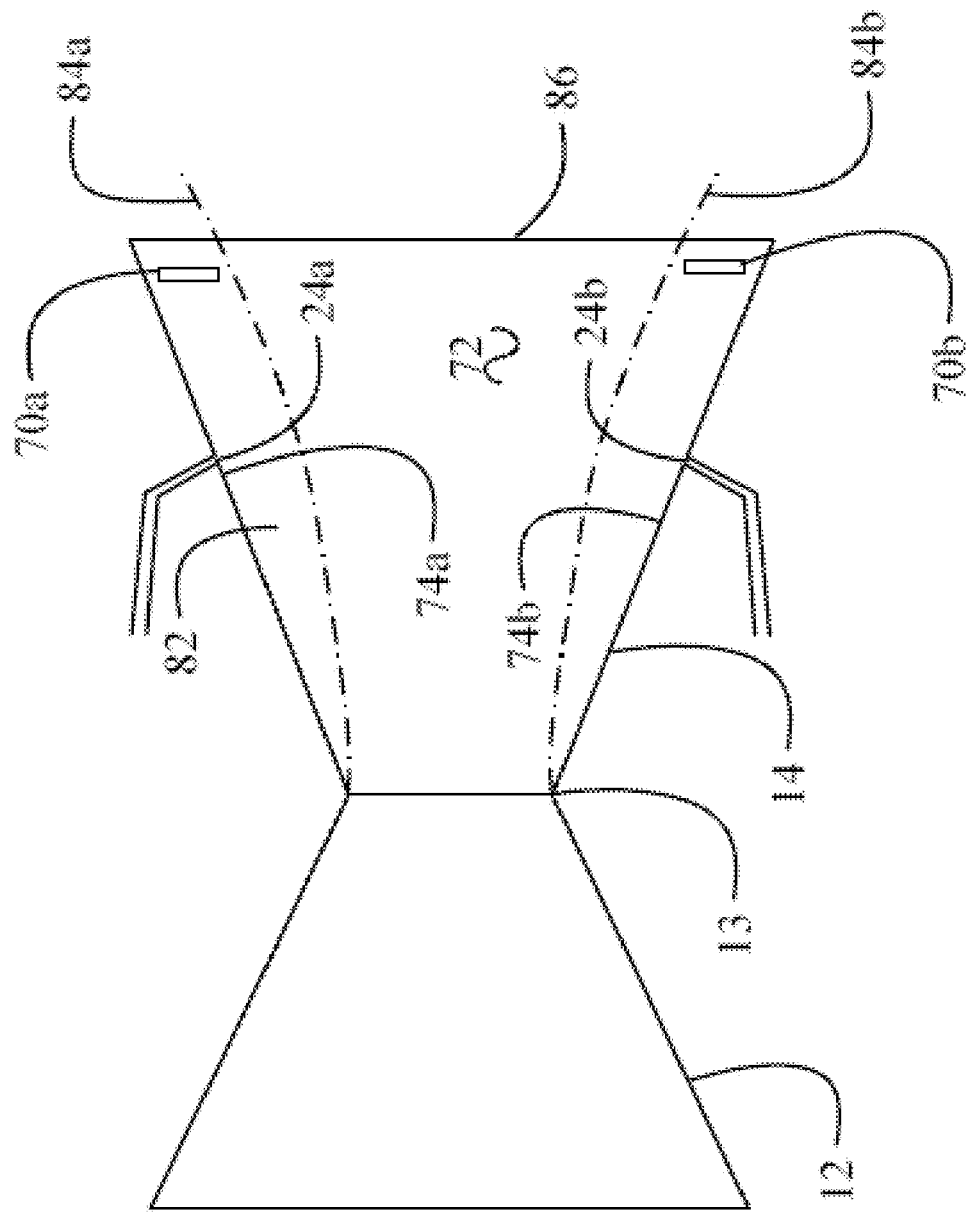

Combination of disturbance generators on both the divergent wall and adjacent wall may also be employed as shown in FIGS. 7A and 7B. Disturbance generators 70a and 70b such as an injection slot for a fluidic jet or a synthetic jet are provided in a wall 72 of the divergent nozzle portion 14. As described with respect to the embodiment of FIGS. 6A and 6B, disturbance generators 70a and 70b are immediately adjacent the intersections 74a and 74b of wall 72 and divergent walls 76a and 76b. In exemplary embodiments the distance of the injection slot from the divergent wall may be 10%-20% of a width 78 of the adjacent wall between the divergent walls from which flow separation is desired. Flow injection as fluidic jets for the exemplary embodiments from the disturbance generators 70a and 70b, are substantially parallel to the divergent walls 76a and 76b. Additionally, disturbance generators 24a and 24b such as injection slots for fluidic jets or synthetic jets are provided in the divergent walls 76a and 76b of the nozzle. For a fluidic jet implementation, the jet 23 from disturbance generator 24a and 24b are substantially perpendicular to the divergent walls 76a and 76b. As previously described with respect to FIGS. 1A and 1B, the injection location will typically be between the midpoint and trailing edge 86 of the divergent outlet portion 14 with exemplary embodiments having a nominal range of 25% to 75% of divergence length. Initiation of the separation pockets 82 may be created by injection in either the disturbance generators 24a and 24b on the divergent walls or the disturbance generator 70a and 70b on the adjacent walls 72a and 72b or both. Modulation of the separation pockets 82 and therefore the effect on exit area may be accomplished by adjustment of flow through either the disturbance generator on the divergent wall or the disturbance generator on the orthogonal wall or both.

Figure 6D:
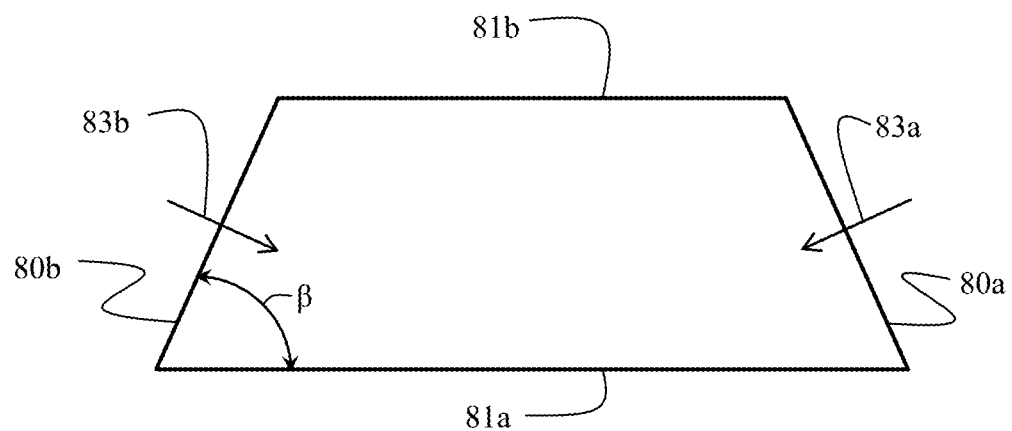
FIG. 6D is an end view of a trapezoidal nozzle exit with adjacent injection.

While described in the preceding embodiments for nozzles employing substantially orthogonal adjacent walls, nozzles having trapezoidal exit areas may also employ the use of disturbance generators for nozzle exit area adjustment. As shown in FIGS. 6D and 7C, aft looking forward in a non-orthogonal exit aperture with flow injection for area control, the angle beta between the adjacent walls 80a and 80b and the diverging walls 81a and 81b would be 90 degrees for the "orthogonally adjacent" condition. However, in practice, this angle beta can vary from 30 to 150 degrees. Use of disturbance generators such as fluidic jets 83a and 83b in FIG. 6D may be employed for creating the flow separation zone as previously described for the embodiments of FIGS. 6A and 6B.

Creation of the flow separations zones may also be induced with a combination of disturbance generators on both the divergent walls and adjacent walls for a trapezoidal exit area as shown in FIG. 7C. Disturbance generators are provided on at least one diverging wall 81a to provide fluidic jets 85a and 85b in addition to the disturbance generators providing fluidic jets 83a and 83b for creating the flow separation zone as previously described for the embodiment of FIGS. 7A and 7B.

Figure 8A:
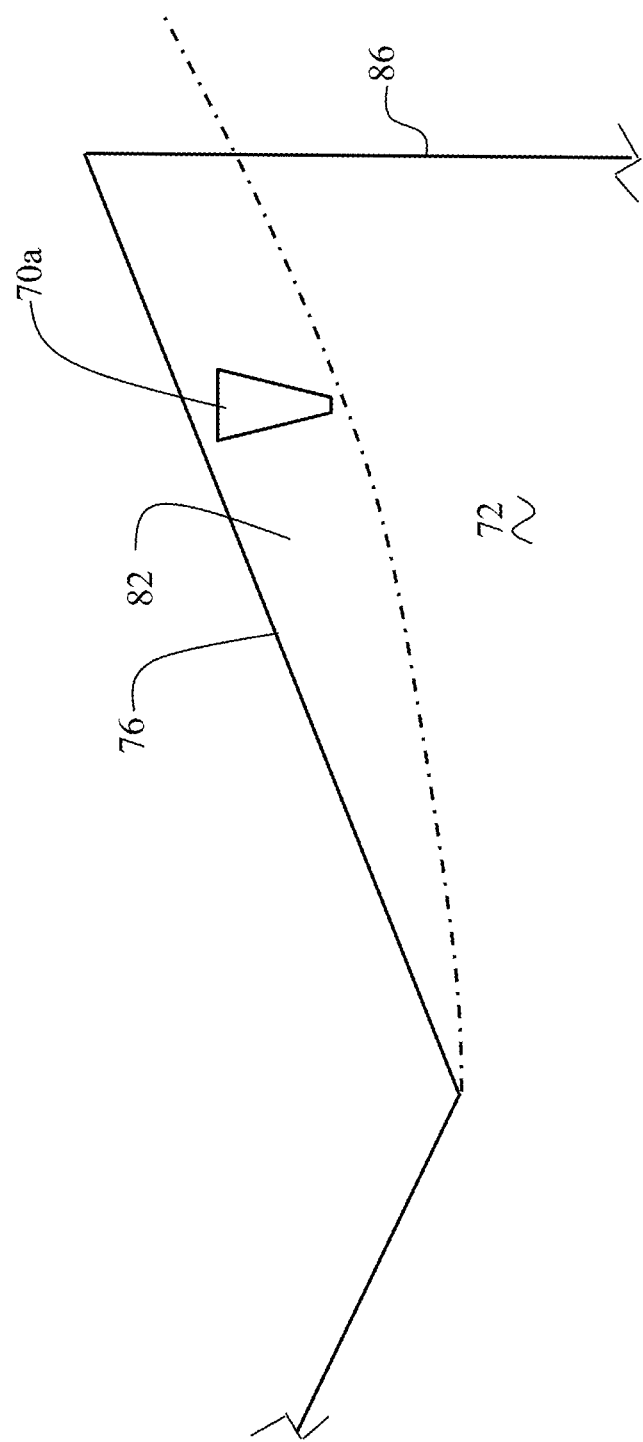
FIG. 8A is a plan view of an injection slot having a tapered planform.
Figure 8B:
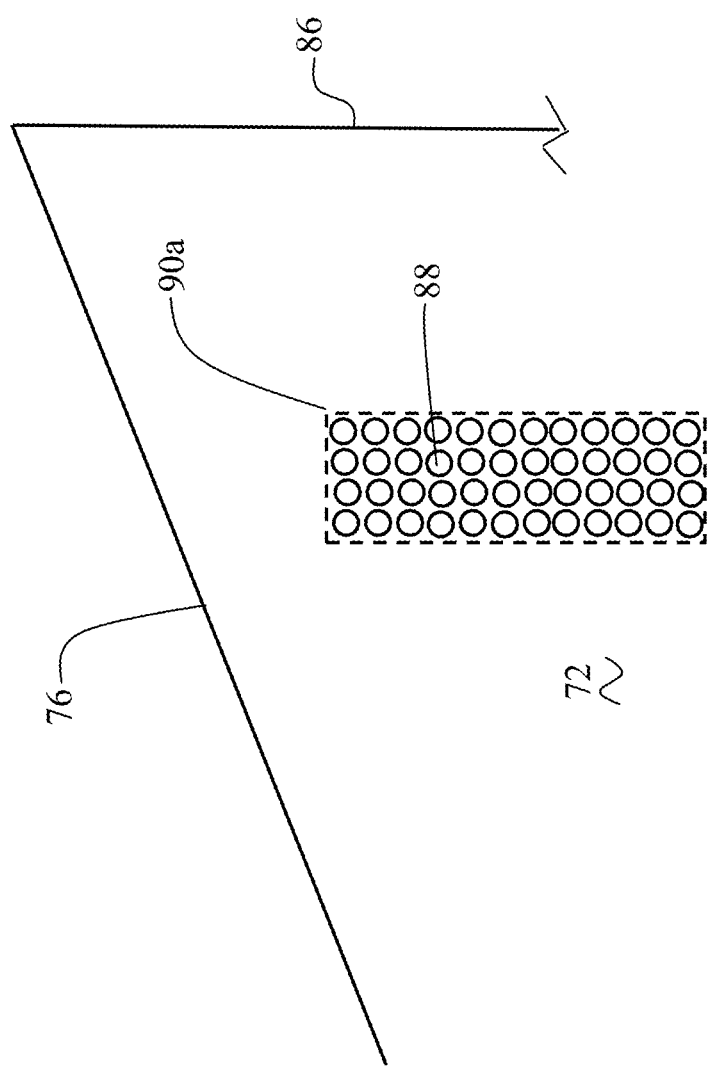
FIG. 8B is a plan view of a perforated injector having a rectangular planform.
Figure 8C:
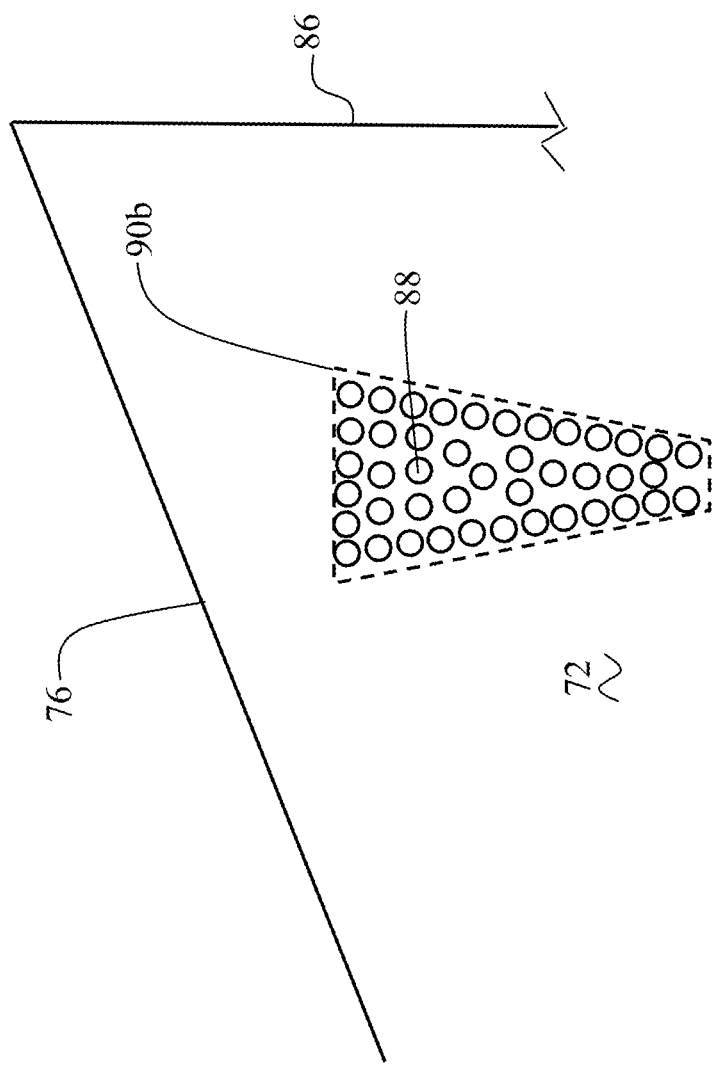
FIG. 8C is a plan view of a perforated injection having a trapezoidal planform; and, FIG. 9 is a flow chart depicting operation of the example nozzle for exit area control.

While the injection slots for the disturbance generators employing fluidic jets are shown in the previously described embodiments as rectangular slots, the jets may be generated with tapering slots 70a as shown in FIG. 8A having a larger streamwise width adjacent the intersection of the divergent and adjacent walls. The tapered slot may be trapezoidal or triangular. Additionally, the slots may be created by spaced perforations 88 in the surface of the wall 72 providing in combination a generalized rectangular or tapered area injector 90a or 90b as shown in FIGS. 8B and 8C respectively.

Methods for adjusting nozzle exit area AE9 have been described. According to some examples, a method for adjusting nozzle exit area may include accelerating a flow to supersonic speed by passing a flow through a convergent-divergent nozzle, which includes a sharp throat, a total angle between convergent and divergent portions of the nozzle of less than 150 degrees, and a divergence angle of the divergent portion of at least 12°, the convergent-divergent nozzle further including a disturbance generator located on the divergent portion, and generating a disturbance by the disturbance generator to induce shockless flow separation from a wall of the divergent portion According to the examples herein, the divergent portion has substantially flat walls extending from the sharp throat and the disturbance generator is located at a predetermined location, which in combination with the geometry of the nozzle is operable to generate a disturbance to create a flow separation zone which extends substantially from the throat to a trailing edge of the nozzle. In some instances, the disturbance generator is fluidic jet which uses a secondary flow (e.g., flow diverted from the engine or exhaust flow to cause the disturbance. In some examples, the disturbance generator may include one or more injection slots. An injected flow of 7.6% results in area AE9 change for a thrust coefficient of 0.965. In further examples, a zero-net max flux jet may be used to cause the shockless flow separation.

Figure 9:
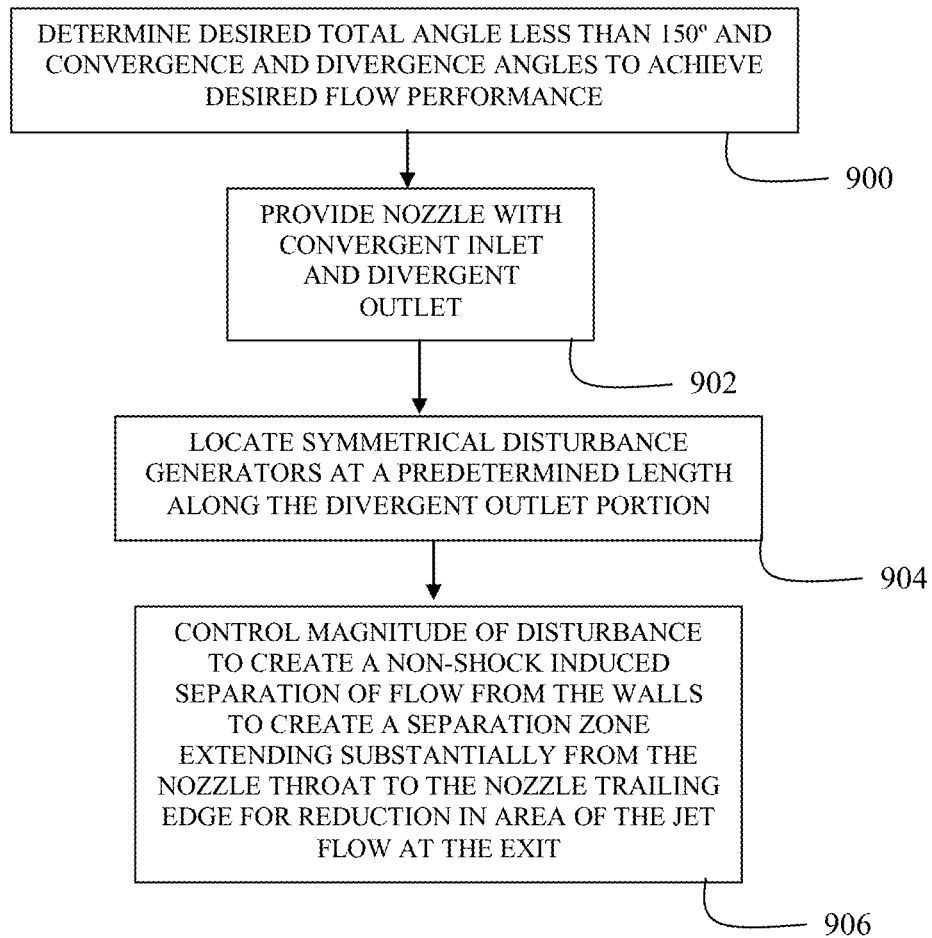

Operation of the embodiments disclosed herein is summarized in FIG. 9. A nozzle with convergent inlet and divergent outlet is provided in step 902 with preliminary determination of a desired total angle and convergence and divergence angles to achieve desired flow performance in step 900. Disturbance generators such as inlet flow slots, vibrating membranes or sonic impulse generators are located substantially symmetrically oppositely at a predetermined length along the divergent outlet portion of the nozzle in step 904 and the magnitude of the disturbance created by the generators is controlled to create a non-shock induced separation of the flow from the wall of the divergent outlet portion to create a separation zone extending substantially from the nozzle throat to the nozzle trailing edge of a magnitude to create a reduction in effective area of the jet flow at the nozzle exit in step 906. A feedback control loop would then be implemented to monitor the current exit flow area and the desired effective exit flow area. The feedback controller would increase/decrease injection to increase/decrease the nozzle effective exit flow area, respectively.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:
1. A nozzle effective exit area control system comprising:
   a convergent-divergent nozzle having a convergent inlet portion with converging inlet walls and with a selected convergence angle from a streamwise nozzle axis and further having a divergent outlet portion with diverging outlet wall and with a selected divergence angle of at least 12° from the streamwise nozzle axis; and
   at least two disturbance generators located in the divergent outlet portion to induce symmetrical flow separation from diverging outlet walls;

said converging inlet walls and diverging outlet walls being substantially flat having an absolute value of a second derivative of a curve defining a surface geometry |y"|, between 0.005 inch$^{-1}$ and 0.002 inch$^{-1}$ in the flow direction, said converging inlet walls and said diverging outlet walls meeting at a sharp throat having an absolute magnitude of the second derivative, |y"|, between 4 inch$^{-1}$ to 8 inch$^{-1}$ and said divergence angle and said convergence angle selected with a total angle between the convergent inlet portion and divergent outlet portion is less than or equal to 150° whereby flow disturbance from the at least two disturbance generators causes flow separation without generation of shock to extend on the divergent outlet portion upstream from the at least two disturbance generators substantially to the sharp throat of the nozzle thereby reducing effective nozzle area.

2. The nozzle effective exit area control system of claim 1 wherein the convergent inlet portion of the nozzle has a predetermined angle of at least 18° and the convergent angle is steeper than the divergent angle.

3. The nozzle effective exit area control system of claim 1 wherein the disturbance generators are injection flow slots.

4. The nozzle effective exit area control system of claim 3 wherein the injection flow slots are located at least 50% of a divergence length from the throat of the nozzle to the exit of the nozzle.

5. The nozzle effective exit area control system of claim 3 wherein the injection flow slots are located between 25% and 75% of a divergence length from the throat of the nozzle to the exit of the nozzle.

6. The nozzle effective exit area control system of claim 3 wherein injection flow through the injection slot is controlled between 0% and 10% of total flow.

7. The nozzle effective exit area control system of claim 3 wherein the convergent-divergent nozzle is a nozzle having a rectangular cross section and said at least two disturbance generators comprise a first injection flow slot on a lower divergent wall of the nozzle and a second injection flow slot on an upper divergent wall of the nozzle.

8. The nozzle effective exit area control system of claim 3 wherein the convergent-divergent nozzle is a 3D nozzle and said at least two disturbance generators comprise a plurality of injection flow slots arranged circumferentially around the divergent outlet portion of the nozzle.

9. The nozzle effective exit area control system of claim 7 wherein said rectangular cross section provides an adjacent wall connecting the diverging outlet walls said at least two disturbance generators comprise a first injection flow slot on the adjacent wall proximate an intersection of the adjacent wall and a first one of the diverging outlet wall of the nozzle and a second injection flow slot on the adjacent wall proximate a second intersection of the adjacent wall and a second one of the diverging outlet walls of the nozzle.

10. The nozzle effective exit area control system of claim 9 wherein said at least two disturbance generators comprise at least four injection flow slots, a first injection flow slot on a lower one of the diverging outlet walls of the nozzle and a second injection flow slot on an upper one of the diverging outlet walls, a third injection flow slot on the adjacent wall proximate an intersection of the adjacent wall and one of said upper and lower diverging outlet walls of the nozzle and a second injection flow slot on the adjacent wall proximate a second intersection of the adjacent wall and said one of said upper and lower diverging outlet walls of the nozzle.

11. An effective exit area control system for a nozzle comprising:

a convergent-divergent nozzle having a convergent inlet portion with a converging wall and a divergent outlet portion of the nozzle with a diverging wall having a predetermined angle of at least 12° from a streamwise nozzle axis; and, a first injection flow slot on the diverging wall of the nozzle and a second injection flow slot on the diverging wall of the nozzle substantially opposite the first slot with respect to the streamwise nozzle axis, each injection flow slot controlled between 0% and 4% of total flow to induce flow separation from the diverging wall;

said convergent-divergent nozzle having a total angle between the converging wall and the diverging wall of no greater than 150 degrees;

said diverging wall and said converging wall being substantially flat having an absolute value of a second derivative of a curve defining a surface geometry, |y"|, between 0.005 inch$^{-1}$ and 0.002 inch$^{-1}$ and extending from a sharp throat having an absolute magnitude of the second derivative, |y"|, between 4 inch$^{-1}$ to 8 inch$^{-1}$ and said predetermined angle of the diverging wall and the total angle selected such that flow disturbance in the divergent outlet portion induces non-shock flow separation to extend upstream on the diverging wall from the first and second injection flow slots substantially to the sharp throat of the nozzle from the diverging wall.

12. The effective exit area control system for a nozzle as defined in claim 11 wherein each of the first and second injection flow slots is located at least 50% of a divergence length from the throat of the nozzle to a trailing edge of the nozzle.

13. The effective exit area control system for a nozzle as defined in claim 11 wherein each of the first and second injection flow slots is located between 25% and 75% of a divergence length from the throat of the nozzle to a trailing edge of the nozzle.

14. A method for nozzle exit area control comprising:
providing a convergent-divergent nozzle having a convergent inlet portion with a selected convergence angle from a streamwise nozzle axis and further having a divergent outlet portion with a selected divergence angle of at least 12° from the streamwise nozzle axis, the convergent inlet portion and the divergent outlet portion each comprise a substantially flat wall having an absolute value of a second derivative of a curve defining a surface geometry, |y"|, between 0.005 inch$^{-1}$ and 0.002 inch$^{-1}$, the walls meeting at a sharp throat having an absolute magnitude of the second derivative, |y"|, between 4 inch$^{-1}$ to 8 inch$^{-1}$, the convergent-divergent nozzle having a divergence angle of at least 12° and a convergence angle steeper than the divergence angle, wherein a total angle between the convergent inlet portion and the divergent outlet portion is less than or equal to 150°;

locating a pair of disturbance generators at predetermined locations substantially symmetrically opposite on a-the divergent portion of the nozzle to induce symmetrical flow separation from diverging walls of the divergent outlet portion; and, controlling a magnitude of a disturbance created by the disturbance generators to create non-shock induced flow separation from the divergent portion extending upstream from the at least two disturbance generators substantially to a sharp throat of the nozzle.

15. The method of claim 14 wherein said predetermined locations of the disturbance generators are defined to create a flow separation zone extending substantially from the throat to a nozzle trailing edge.

16. The method of claim 14 wherein the step of controlling the magnitude of the disturbance further includes creating a flow separation zone to induce a desired nozzle exit area reduction.

17. The method of claim 14 wherein the step of locating a pair of disturbance generators comprises providing injection flow slots on opposing walls of the divergent portion.

18. The method of claim 17 wherein the step of providing injection flow slots includes locating the flow injection slots at least 50% of a divergence length from the throat of the nozzle to a trailing edge of the nozzle.

19. The method of claim 17 wherein the step of providing injection flow slots includes locating the flow injection slots between 25% and 75% of a divergence length from the throat of the nozzle to a trailing edge of the nozzle.

20. The method of claim 17 wherein the step of controlling the magnitude of the disturbance comprises injecting a flow of between 0% and 10% of total flow through the slots.

21. The method of claim 14 wherein the step of locating disturbance generators comprises locating vibrating membranes on opposing walls of the divergent portion.

22. The method of claim 14 wherein the step of locating disturbance generators comprises locating sonic impulse generators on opposing walls of the divergent portion.

\* \* \* \* \*